Figure 1:
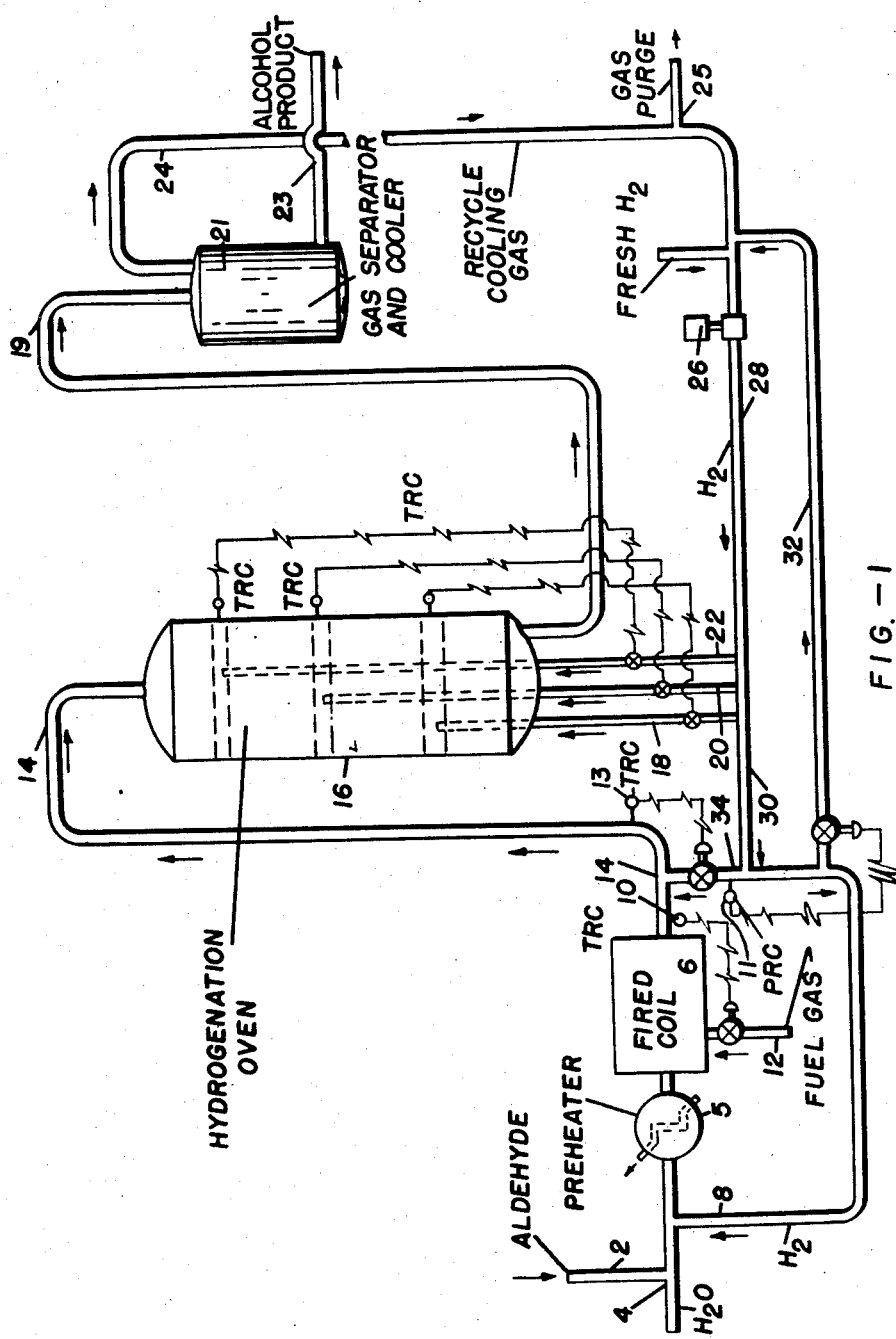
Figure 2:
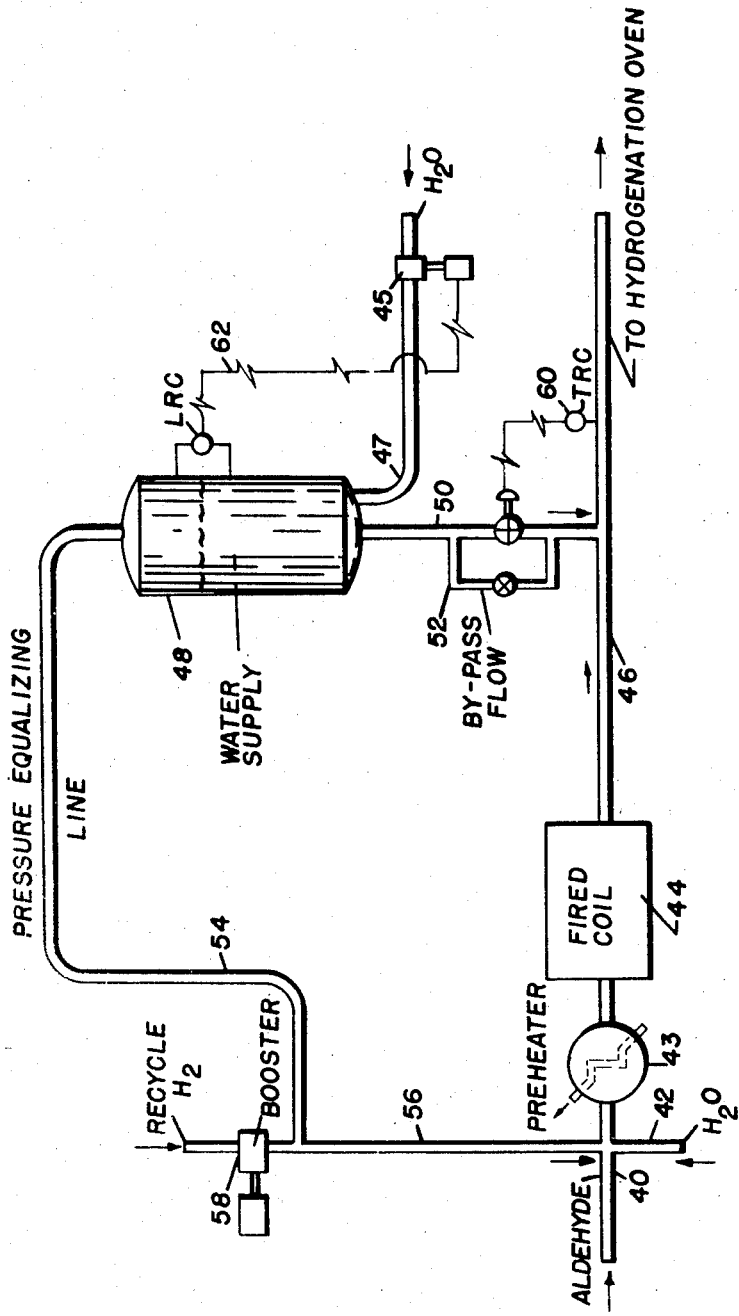

United States Patent Office

2,771,493
Patented Nov. 20, 1956

2,771,493

ALDEHYDE HYDROGENATION QUENCH

Robert L. Jacks, James E. Moise, and Edward W. S. Nicholson, Baton Rouge, La., assignors to Esso Research and Engineering Company, a corporation of Delaware Application March 23, 1953, Serial No. 343,992

13 Claims. (Cl. 260—638)

The present invention relates to the preparation of oxygenated organic compounds by the reaction of olefinic carbon compounds with hydrogen and carbon monoxide in the presence of a carbonylation catalyst. More specifically, this invention relates to an improved process for hydrogenating the aldehyde product produced in the first stage of the process.

It is now well known in the art that aldehydes and alcohols may be synthesized from olefinic compounds by reaction of the latter with CO and $H_2$ in the presence of a catalyst containing a group VIII metal, preferably cobalt, in an essentially three-stage process. In the first stage, the olefinic material, catalyst and synthesis gases are reacted under superatmospheric pressures to give a product consisting predominantly of aldehydes containing one more carbon atom than the olefinic starting material, as well as a certain amount of secondary reaction products, polymeric material and higher boiling products. This oxygenated organic mixture, which contains in solution compounds of the metal catalyst, is then generally given a thermal treatment to cause decomposition and removal of the catalytic material from the organic mixture. The catalyst-free material is then hydrogenated at elevated temperatures and pressures in a hydrogenation stage to the corresponding alcohol, and it is to this hydrogenation stage that the principal invention relates.

This carbonylation reaction provides a particularly attractive method for preparation of valuable primary alcohols, and substantially all organic compounds having olefinic unsaturation may be employed as feeds.

The catalyst for the first stage of the process is usually added in the form of oil-soluble salts of cobalt, such as cobalt oleate, naphthenate, and the like. However, other forms of cobalt, such as cobalt oxides, water-soluble salts, cobalt carbonyl, and even the metal may be employed, for the active form of the catalyst is probably cobalt hydrocarbonyl, and all other forms of cobalt are converted to this in the course of the reaction.

Synthesis gas is preferably supplied to the first stage in about equimolar proportions of $H_2$ and CO, though the ratio may range from 4/1 to 1/4. The reaction is generally conducted at pressures of from about 2500 to 4500 p. s. i. g. and temperatures of from 250°–400° F.

At the end of the first stage, the aldehyde product containing a high proportion of cobalt carbonyl in solution is passed to a catalyst removal, or clarification zone where, in the presence of heat and a gaseous or liquid fluid, the cobalt carbonyl is decomposed and the aldehyde product freed from dissolved catalyst.

The hydrogenation stage may be operated at conventional hydrogenation conditions, including temperatures in the range of 300° to 550° F., and pressures of the same order of magnitude as those obtaining in the carbonylation stage. Conventional hydrogenation catalysts include molybdenum, nickel, copper chromite and the like. The liquid product from the hydrogenation stage is worked up by distillation to separate the desired alcohol product from unconverted feed and secondary reaction products.

A hydrogenation catalyst particularly suitable for this service has been found to be molybdenum sulfide supported on an activated carbon carrier. This catalyst, consisting of about 10% molybdenum sulfide, has been found to be exceptionally rugged and long lived. Furthermore, it is not susceptible to sulfur poisoning nor to poisoning by carbon monoxide, such as would be experienced by the sulfur-sensitive catalysts, such as nickel. However, the molybdenum sulfide catalyst requires somewhat higher temperatures than the sulfur-sensitive catalyst, in the range of about 400 to 550° F., preferably 425° to 525° F., for attaining its maximum activity. These higher temperatures in the hydrogenation even favor formation of secondary reaction products, such as aldols, esters, and hydrocarbons resulting from over-hydrogenation. By addition of water to the hydrogenation stage, however, in amounts up to about 10%, the formation of these secondary reaction products is repressed and alcohol selectivity favored.

One of the major problems involved in the hydrogenation of the aldehyde synthesis product, particularly on a commercial scale operation, is the danger of temperature runaways in the hydrogenation zone. Aldehyde hydrogenation is an exothermic process, but the reactants must be brought up to the temperature level required for the hydrogenation to be initiated, and this level depends upon the activity characteristics of the catalyst. Should the reactants be heated too high, destructive hydrogenation starts to occur and the hydrogenation bed temperature may rise uncontrollably to 1200° F. and higher, with resultant permanent loss in catalyst activity and danger of rupturing equipment. This danger is particularly apparent in the case of sulfactive catalysts, such as molybdenum sulfide, which require a higher temperature to initiate the hydrogenation reaction, i. e. a temperature of about 425°–475° F. However, if the hydrogenation temperature rises inadvertently, even a relatively few degrees, up to 570°–600° F., the reaction suddenly becomes one of destructive hydrogenation, control of the catalyst bed temperature is irretrievably lost, the catalyst and the product both are ruined, and the plant endangered. Thus, when operating with a sulfactive hydrogenation catalyst, there is a relatively narrow temperature band within which the operation must be maintained, the width of which depends upon the nature of the catalyst and the product being hydrogenated.

In commercial operation, it is the practice to add cold reaction hydrogen to the aldehyde product from the decobalting operation and heat the oil-gas mixture up to temperatures of 425° to 520° F., by passing the latter to a fired coil or furnace. Because of its beneficial effects upon alcohol selectivity in the hydrogenation reaction, about 5–15% water on the feed to the hydrogenation zone is also passed to the fired coil where the mixture is heated up to about 425°–520° F. The lower coil outlet temperature, about 425° F., is used during the initial part of a run when the hydrogenation catalyst is fresh and highly active. As the hydrogenation catalyst ages, it is necessary to employ successively higher temperatures in the hydrogenation oven, and this requires gradually raising the coil outlet temperature. By the end of the run, when the hydrogenation catalyst is spent and must be replaced, the coil outlet temperature required may be in the range of 520° F.

From the furnace, the aldehyde product is passed to the top portion of a hydrogenation oven which is preferably divided into alternate reaction and cooling zones. Hydrogen at about 80° to 120° F. is passed into each of the cooling zones to cool the product which has become heated to elevated temperatures as a result of the exothermic hydrogenation reaction. This gas is supplied at about 200 p. s. i. g. above the pressure existing in the reactor. Thus, aldehyde product admitted into the topmost zone at about 475° F., reaches the first gas injection, or cooling zone, at a temperature of 500° F. The cooling gas again lowers the temperature to 475° F., and the product is heated to 500° F. as a result of further hydrogenation, until the next cooling, or gas injection zone is reached. These zones are generally spaced increasingly further apart in the direction of flow of product.

As long as the system is in thermal balance and operating normally, this operation has been found to be quite satisfactory for controlling the reaction temperature within the hydrogenation zone. However, not infrequently, failures and breakdown in equipment, particularly in the pumps feeding aldehyde and water to the fired coil, occur. With present equipment, such failures always result in increased coil outlet temperatures, even if all fires to the furnace are immediately extinguished. This is because of the high heat content of the furnace brickwork and tubes; when the feed rate is decreased suddenly for any reason, as by pump failure, heat continues to be transferred from the furnace walls and it heats the smaller quantity of material passing through the tubes to a higher than normal temperature. The high temperature feed materials reach the reactor inlet in a very few moments and can raise the inlet section of the reactor catalyst, and subsequently the rest of the reactor catalyst bed to a dangerously high temperature level before anything can be done to prevent it. Present temperature control systems are entirely inadequate to cope with this situation. In the first place, merely cutting out the furnace fires will not lower coil outlet temperature quickly enough because of the large heat content of the furnace materials; and secondly, the normal recycle gas cooling system does not have adequate capacity to provide the large amount of extra cooling gas that would be required to compensate for the additional rate of heat release in the reactor when the bed temperature rises above the safe limit. Thus, the feed to the hydrogenation reactor may readily reach a temperature of about 600°–700° F., and once a feed at a temperature of 600°–700° F., reaches the hydrogenation catalyst, temperature runaway occurs, because of the nature of the hydrogenation reaction at these high temperatures.

Not only breakdowns or failure of the pumps may be responsible for these temperature runaways. Failure in control of furnace firing, in the gas recycle system, and failure in other equipment may also cause them. Even temporary sticking of the pumps may cause enough irregularity in the volumes of aldehyde and water being pumped so that the temperature of the feed reaching the hydrogenation oven is above the permissible limit.

Though it is impossible to protect indefinitely against failures of each piece of equipment, in accordance with the present invention, temperature runaways from any cause or any failure of equipment are completely prevented by injection of a fluid under high pressure into the product stream emerging from the fired coil. In one embodiment, a high pressure gas stream, provided as detailed below, is continuously injected, while in another embodiment, a high pressure supply of water is constantly available for emergency use. Strategically placed control instruments regulate these sources, so that if the coil outlet temperature for any reason should rise to a predetermined value, the fluid is instantly and automatically admitted to the coil outlet to lower the temperature below this maximum, thus assuring that the hydrogenation oven inlet temperatures can never rise to a dangerously high level.

Having set forth its general nature, the invention will best be understood from the following more detailed description in which reference will be made to the accompanying drawings.

Figure I illustrates a system adapted to carry out the embodiment of the invention employing the gas-quenching principle.

Figure II shows a modification employing quenching with high pressure water.

Turning now to Figure I, aldehyde product prepared in the manner previously described, and water are passed via lines 2 and 4, respectively, and preheater 5, into fired coil 6. Also, hydrogen may be admitted through line 8, for preheating to reaction conditions. The amount of water is about 5–15% on aldehyde product. Fuel gas is passed into fired coil 6 through line 12 to provide the heat requirements. At normal operating conditions, the coil metal temperature may be about 1000° F. Heated aldehyde product normally at a temperature of about 475° F. is withdrawn from coil 6, a pressure of about 3200 p. s. i. g. being maintained therein. The product is passed through line 14 into the upper portion of hydrogenation oven 16, which is preferably divided into discrete hydrogenation zones, interspersed with cooling zones wherein cooled recycled gas is injected via lines 18, 20, and 22. The hydrogenation catalyst maintained in the plurality of zones is preferably molybdenum sulfide supported on activated carbon pellets. Temperatures within oven 16 are in the range of about 475° to 525° F., and must not be allowed to rise above about 600° F. Pressures in the range of about 3000 to 3200 p. s. i. g., obtain in the hydrogenation zones.

The alcohol product formed, as well as unreacted gases and water, are passed via line 19 to a gas separation and cooling unit 21. Alcohol product is withdrawn through line 23 and passed to the finishing section, while cooled gas, at a temperature of about 120° F., is passed to compressor 26 via line 24 for recycle to the system and to furnish cooling in the manner previously described. Some gas is purged through line 25 to prevent buildup of inerts in the system.

In accordance with the present invention, a substantially larger amount of cooling gas than is required normally for cooling purposes is continuously recycled through compressor 26, lines 28, 30, and 32. A small amount of this cooling gas is normally bled into line 14 through line 34. Thus, as an illustration, for every 100 cu. ft. of hydrogen discharged from the compressor, 50 cu. ft. are passed into the hydrogenation zones via lines 8, 14, 18, 20 and 22; 49 cu. ft. are recycled to the compressor through line 32; and 1 cu. ft. is passed into the coil outlet line 14 through line 34. This is to insure the system being in proper working condition at all times.

If now a pump failure or other failure occurs which would cause the temperature of the products leaving the furnace to rise, the temperature recording controller (TRC) 10 on the coil outlet cuts the fires out completely when the outlet temperature reaches a predetermined point, say about 30° F. above the normal coil outlet temperature, by closing the valve in fuel inlet line 12. A pressure recording controller (PRC) 11 is provided on the compressor discharge line and a TRC 13 on the feed inlet line 14 to the hydrogenation zone. Responsive to the increase in temperature above the set point in the fired coil outlet line, the valves actuated by TRC 13 and PRC 11, respectively, open and close to discharge the reserve high pressure cooling gas into the coil outlet line 14, in sufficient quantity to hold the temperature of the total mixture of materials passing to the reactor below the predetermined maximum safe temperature of 30° F. above the normal coil outlet temperature. Thus, this system precludes the possibility of dangerously high temperature materials getting to the reactor inlet. The system has been found to respond in a matter of seconds. It continues in operation until control of the coil outlet temperature has been reestablished through reduction of the furnace heat input or repair of the condition responsible for the temperature surge, after which all normal recycle gas flows are automatically resumed, and the furnace fires are relighted.

In Figure II, there is shown an embodiment of the invention wherein high pressure water is employed as a quench. As in the case of Figure I, aldehyde feed, as well as water and hydrogen, are passed into fired coil 44 through lines 40, 42, and 56, respectively, and, under normal conditions, the preheated mixture at a temperature of about 425°–520° F., is passed via line 46 to the hydrogenation oven. In accordance with the present embodiment of the invention, a source of high pressure water is maintained under pressure of about 3500 p. s. i. g., and about 60°–100° F., in vessel 48, the water being supplied through line 47 and pump 45. Even during normal operation, a small flow of water, say 0.5% of the effluent from the fired coil 44, is passed through lines 50 and 52 into the fired coil effluent to ensure that the system is always in proper working order for instant service. TRC 60 is installed in the system responsive to the temperature of the effluent from the coil. When the coil outlet temperature rises above a predetermined differential, say 30° F., over the normal coil outlet temperature, the valve actuated by TRC 60 opens and water is instantly and automatically admitted to line 46 to hold the temperature below this point. A level recorder controller (LRC) 62 actuates booster 45 to pump more water into vessel 48 to maintain the liquid level therein.

Thus, as in the case of the equipment shown for Figure I, this system also makes it impossible for any materials above a predetermined safe maximum temperature from reaching the reactor catalyst bed, and it holds the temperature of the reactor inlet mixture in a safe range until the cause of the temperature upset can be remedied. Throughout such upsets, the normal recycle cooling gas temperature control system for the reactor catalyst bed continues in operation in its normal manner.

The process of the present invention may be modified in many ways. Though emphasis has been placed upon its suitability for aldehyde hydrogenation, and specifically with a relatively high temperature hydrogenation catalyst, the quench system may be employed advantageously generally where exothermic liquid-gas reactions are involved, particularly, those carried out under relatively high pressures.

Other modifications apparent to those skilled in the art are within the scope of the invention.

What is claimed is:

1. In the process wherein aldehydes are hydrogenated to alcohols in a catalytic hydrogenation zone at elevated temperatures and pressures and wherein said aldehydes are heated to hydrogenation temperatures in a heating zone and said heated aldehydes passed to said hydrogenation zone, the improvement which comprises maintaining an extraneous cooling fluid at a pressure above and a temperature below those obtaining in said hydrogenation zone, continuously passing a minor portion of said fluid into the aldehyde-comprising stream passing from said heating zone into said hydrogenation zone, and passing a further portion of said fluid into said stream when the temperature of said stream exceeds a predetermined maximum, said added quantity being in amounts sufficient to decrease the temperature of said aldehyde-comprising stream to less than said predetermined maximum.

2. In the process wherein aldehydes are hydrogenated to alcohols in a catalytic hydrogenation zone at elevated temperatures and pressures and wherein said aldehydes, water and hydrogen are heated to hydrogenation temperatures in a heating zone, said heated reactants passed to a hydrogenation zone, a product stream comprising alcohols and hydrogen withdrawn from said hydrogenation zone, passed to a cooling and liquid-gas separation zone, and at least a portion of said separated gases compressed in a compression zone and recycled to said hydrogenation zone to provide cooling in said zone, the improvement of maintaining a source of high pressure hydrogen for controlling hydrogenation temperatures and preventing temperature runaways in said hydrogenation zone which comprises compressing a substantially larger amount of cool hydrogen than that normally required for said recycle cooling, passing a minor amount of said compressed hydrogen into the effluent stream from said heating zone, and recycling the balance of said hydrogen stream back to said compression zone.

3. The process of claim 2 wherein the amount of high pressure hydrogen passed to said effluent stream from said heating zone is responsive to temperature changes in said effluent stream.

4. The process of claim 3 wherein said high pressure hydrogen stream normally recycled to said compression zone discharges into said effluent stream when the temperature of said effluent stream exceeds a predetermined value, in amounts sufficient to cool said stream below said value.

5. The process of claim 2 wherein said hydrogenation temperatures are in the range of about 300°–550° F. and said hydrogenation pressures about 2500–4500 p. s. i. g.

6. The process of claim 2 wherein the temperature of the effluent stream from said heating zone is about 425–520° F.

7. The process of claim 4 wherein said predetermined temperature is no higher than 600° F.

8. The process of claim 2 wherein about 1% of said hydrogen stream from said compression zone is normally passed into the effluent stream from said heating zone when the temperature of said effluent stream is less than said predetermined value.

9. The process of claim 2 wherein catalyst in said catalytic hydrogenation zone is molybdenum sulfide supported on activated carbon.

10. In the process wherein aldehydes are hydrogenated to alcohols in a catalytic hydrogenation zone at temperatures of from about 300°–550° F., and pressures of from about 2500–4500 p. s. i. g. and wherein said aldehydes are heated to hydrogenation temperatures in a heating zone and said heated aldehydes passed to said hydrogenation zone, the improvement which comprises maintaining a source of water at a pressure above and a temperature below those obtaining in said hydrogenation zone, continually passing a minor amount of said water into the effluent stream from said heating zone, and adding additional amounts of said water when the temperature of said effluent stream exceeds a predetermined value, in quantities sufficient to lower said temperature below said predetermined value.

11. The process of claim 10 wherein said water is at a pressure of about 3500 p. s. i. g. and a temperature of about 60–100° F.

12. The process of claim 10 wherein an amount of water equal to about 0.5% of said effluent is normally passed into said effluent stream when the temperature of the latter is less than said predetermined value.

13. The process of claim 10 wherein said predetermined value of said effluent temperature is no greater than 600° F.

References Cited in the file of this patent

UNITED STATES PATENTS

| | | |
|---|---|---|
| 1,569,339 | Sinclair | Jan. 12, 1926 |
| 2,305,104 | Pardee | Dec. 15, 1942 |
| 2,432,099 | Kimberlin | Dec. 9, 1947 |
| 2,570,487 | Ross et al. | Oct. 9, 1951 |
| 2,637,746 | Parker | May 5, 1953 |

FOREIGN PATENTS

| | | |
|---|---|---|
| 120,163 | Great Britain | Oct. 31, 1918 |